United States Patent [19]

Lepper et al.

[11] Patent Number: 4,520,296
[45] Date of Patent: May 28, 1985

[54] ELECTRIC MOTOR DRIVE ARRANGEMENT

[75] Inventors: Eberhard Lepper; Karl-Heinz Lust, both of Lahnau, Fed. Rep. of Germany

[73] Assignee: Arthur Pfeiffer Vakuumtechnik Wetzlar GmbH, Asslar, Fed. Rep. of Germany

[21] Appl. No.: 477,224

[22] Filed: Mar. 21, 1983

[30] Foreign Application Priority Data

Mar. 20, 1982 [DE] Fed. Rep. of Germany ....... 3210352

[51] Int. Cl.$^3$ .................. H02P 5/06; H02K 37/00
[52] U.S. Cl. .................... 318/254; 318/138; 318/439; 318/341; 318/282
[58] Field of Search ............ 318/138, 254, 341, 439, 318/599, 282, 286, 256, 264, 265, 285, 266, 466, 467, 468, 470, 603

[56] References Cited

U.S. PATENT DOCUMENTS

| 3,171,075 | 2/1965 | Kirk | 318/254 X |
| 3,486,099 | 12/1969 | Brunner et al. | 318/254 A |
| 3,525,029 | 8/1970 | Joslyn et al. | 318/341 X |
| 3,824,440 | 7/1974 | McIntosh | 318/341 X |
| 3,911,338 | 10/1975 | Igarashi et al. | 318/138 |
| 4,020,361 | 4/1977 | Suelzle et al. | 318/341 X |
| 4,249,116 | 2/1981 | Hieda | 318/138 X |
| 4,374,347 | 2/1983 | Müller | 318/254 X |

FOREIGN PATENT DOCUMENTS 2729407 1/1979 Fed. Rep. of Germany ...... 318/341

OTHER PUBLICATIONS

Control Engineering, vol. 24, No. 3, 3/77, (High Frequency SCR Chopper Circuit Improves DC Servo Motor Response).
Henmann-Stump, "Thyristors", 2nd Edition, 1970, p. 148.
Swiss Journal, "Technische Rundschau", vol. 2, Jan. 15, 1974, pp. 27, 29 and 31.

Primary Examiner—Stanley J. Witkowski
Assistant Examiner—Paul Shik Luen Ip
Attorney, Agent, or Firm—Toren, McGeady and Stanger

[57] ABSTRACT

A drive arrangement for the shaft of a turbo molecular pump comprises a motor supply, including a chopper which controls a voltage source, and a motor with two phase windings connected via a current measuring resistor to the neutral point of the voltage source. The voltage drop at the resistor is proportional to the motor current and so influences the width of the control pulses of a pulse-width modulator connected to control the chopper that the motor current remains constant. Switching transistors for the motor have parallel oppositely-connected diodes which, upon disconnection of a phase winding, supply residual energy to capacitors in the circuit.

7 Claims, 3 Drawing Figures

ELECTRIC MOTOR DRIVE ARRANGEMENT

BACKGROUND OF THE INVENTION

The invention concerns an electric motor drive arrangement and in particular a drive for the shaft of a turbo molecular pump operating according to the principle of a brushless d.c. motor.

In this specification, references will be made to the following sources:
1. Siemens Technical Communications from the field of Components
    Macek, Hirschmann ia: Switching Power Supplies, IB 1703
    Ackermann et. al: Switching Power Supplies, IIB 1764
    Schaller: Switching Power Supplies, IIIB 1821
    Macek: Switching Power Supplies, IV 1749
2. Valvo Technical Information for Industry
    Van Velthooven: Dimensioning of flow transducers Hedderscheid: No. 76 11 05 Nov. 1976
3. Muller: Two pulse d.c.motors without collectors asr. digest for applied drive technology issue 1/2/1977
4. Kappius, Liska: Electronic motors for industrial application. Siemens Journal 45 (1971) issue 4.
5 Instructions for use for turbo molecular pumps TPH 110 and drive electronics TCP 270.
No. PM 800 061 BD Firm A. Pfeiffer Vakuumtechnik Wetzlar GmbH, Postfach 1280 D-6334 Asslar.

Brushless d.c. motors are known from publications concerning small type motors (3), (4). They illustrate various alternatives of the phase windings with the necessary switching elements. The described motors have a low power consumption and the driven shafts small moments of inertia, so that the motors quickly reach their operative rotational speed. For these reasons a simple voltage supply is possible.

With turbo molecular pumps the drive motors are located in a vacuum. The rotors of these pumps rotate with a very high frequency (up to 90,000 revs/min). Their operating efficiency depends practically only on the bearing friction. Since the rotors store a large amount of rotational energy on account of their high moment of inertia and the high rotational speed, a very high torque is necessary for the acceleration of the rotor to bring the pump to its operative rotational speed in the shortest time possible. During this starting phase the rotor is accelerated with constant torque, which with d.c. motors requires an operation with constant current. The brushless d.c. motors used for this must accordingly be adapted to these operating conditions.

A brushless d.c. motor with four phase windings for the drive of turbo molecular pumps is known from the company document (5). The current supply of this motor is illustrated in FIG. 2. It consists of a mains transformer with a rectifier for the production of an intermediate d.c. voltage Uz, and a voltage controller which is preferably constructed as a switching controller with a storage coil. During the run-up the current supply so controls the operating voltage $U_b$ that the total current of the motor, which is measured at the current resistor $R_1$, remains constant. Upon reaching of the operative rotational speed the tachometer takes on the control function and controls the voltage controller so that the operative rotational speed remains constant.

Furthermore, switching controls are known, for example from (1) and (2), which replace the mains transformer (FIG. 3). Within a chopping stage the rectified mains voltage is chopped, with the help of switching transistors having a higher switching frequency compared to the mains frequency, and by means of a transformer an intermediate voltage Uz for the motor is produced. The switching transistors are controlled by means of a pulse width modulator which by means of an automatic control loop keeps constant the voltage provided by the transformer. The current control during run-up as well as the control of the rotational speed during operation result from a second switching controller (storage coil controller, pulse width modulator) as described in the preceding paragraph.

The circuits described above have the following disadvantages:
1. The four-phase winding fills up the winding space poorly, which results in increased ohmic losses.
2. The magnetic energy still provided upon disconnection of the respective winding is not regenerated, but is used up in the Zener diodes or the switching transistors.
3. With defective switching transistors in the operative voltage controller, the full intermediate d.c. voltage Uz occurs at the motor, which leads to the running away of the operative rotational speed and thus to a safety risk for the turbo molecular pump. Moreover with defective current control in the intermediate circuit the switching transistors $T_5$ to $T_8$ can be destroyed by overloading.
4. The described examples require either a large mains transformer for the separation of mains voltage and motor voltage or a second control circuit for the stabilisation of the intermediate circuit voltage Uz.

SUMMARY OF THE INVENTION

The present invention seeks to overcome or reduce the described disadvantages and to provide an arrangement for achieving, in a simple manner, an increased operating safety in the drive of turbo molecular pumps.

Accordingly the invention provides an electric motor drive arrangement comprising a motor supply, said supply having a chopper circuit controlling a voltage source having a neutral point, a pulse width modulator producing control pulses, said pulse width modulator being connected to said chopper circuit and a motor having two phase windings connected together at one end at a common connection point, said common connection point being itself connected to said neutral point of said voltage source via a current-measuring resistor, a voltage drop arising at said resistor, said voltage drop being proportional to the current through said motor and so influencing the width of said control pulses of said pulse width modulator that the motor current remains constant.

The invention also provides a drive arrangement for the shaft of a turbo-molecular pump operating according to the principle of a brushless d.c. motor having a permanent-magnetic rotor and a stator with two phase windings electrically shifted by 90°, first ends of said phase windings being inter-connected, a centre tappd voltage source having a positive and a negative terminal, four controllable switching elements, the other ends of said phase windings being connectable to said positive and negative terminal of said centre-tapped voltage source in each case by means of two respective ones of said controllable switching elements, a commutation device controlling said four switching elements, a current supply apparatus for operation of the motor, said current supply apparatus consisting of a rectifier, a chopper, a transformer having a primary winding and a secondary centre-tapped winding said chopper switching said primary winding of said transformer, a pulse-width modulator producing control pulses controlling the chopper, four rectifier diodes connected to said secondary winding in a full wave rectifier cicuit, with a coil connected to each output of said rectifier circuit, the outputs of said coils forming the positive and negative supply terminals for the connection of the motor, with serially-connected capacitors connected at the outputs of said coils, the junction point of said capacitors together with the center tap of said secondary winding forming a common neutral point, wherein the two motor phase windings are interconnected at a common end, said common end being connected to said common neutral point by means of a current-measuring resistor and the volage drop at said current-measuring resistor is proportional to the motor current and so influences the width of said control pulses for the chopper that the motor current remains constant.

The invention further provides a drive arrangement for the shaft of a turbo-molecular pump operating according to the principle of a brushless d.c. motor having a permanent-magnetic rotor and a stator with two phase windings electrically shifted by 90°, first ends of said phase windings being inter-connected, a centre-tapped voltage source having a positive and a negative terminal, four controllable switching elements, the other ends of said phase windings being connectable to said positive and said negative terminal of said centre-tapped voltage source in each case by means of two respective ones of said controllable switching elements, a commutation device controlling said four switching elements, a current supply apparatus for operation of the motor, said current supply apparatus consisting of a rectifier, a chopper, a transformer having a primary winding and a secondary centre-tapped winding said chopper switching said primary windings of said transformer, a pulse-width modulator producing control pulses controlling the chopper, four rectifier diodes connected to said secondary winding in a full wave rectifier circuit, with a coil connected to each output of said rectifier circuit, the output of said coils forming the positive and negative supply terminals for the connection of the motor, with serially-connected capacitors connected at the outputs of said coils, the junction point of said capacitors together with the centre tap of said secondary winding forming a common neutral point, wherein diodes are provided parallel to said four switching elements with opposed direction of flow, said diodes, upon disconnection of the corresponding phase winding, feeding back to said capacitors the remaining induction energy stored in the winding.

BRIEF DESCRIPTION OF THE DRAWINGS

A preferred embodiment of the present invention will now be described, by way of example only, with reference to the accompanying drawings, of which.

DESCRIPTION OF THE PREFERRED EMBODIMENT

Basically the invention provides an electric motor drive arrangement comprising a motor supply, having a chopper circuit which controls a voltage source, and a motor with two phase windings connected together at one end, the common connection being itself connected to the neutral point of the voltage source via a current-measuring resistor $R_1$, the voltage drop at which is proportional to the motor current and so influences the width of the control pulses of a pulse width modulator connected to control the chopper that the motor current remains constant.

Figure 1:
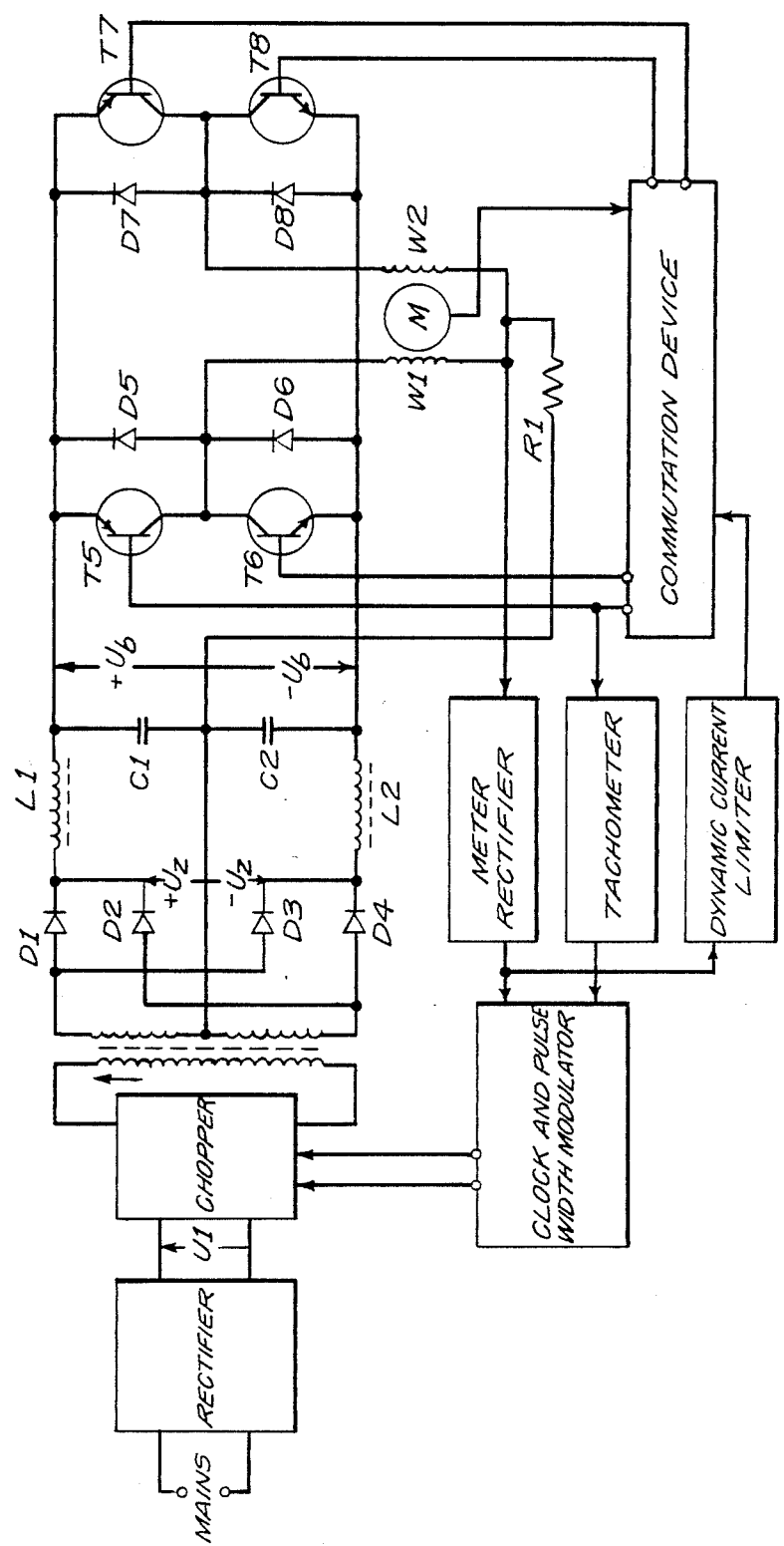
FIG. 1 shows an arrangement according to the invention.
Figure 3:
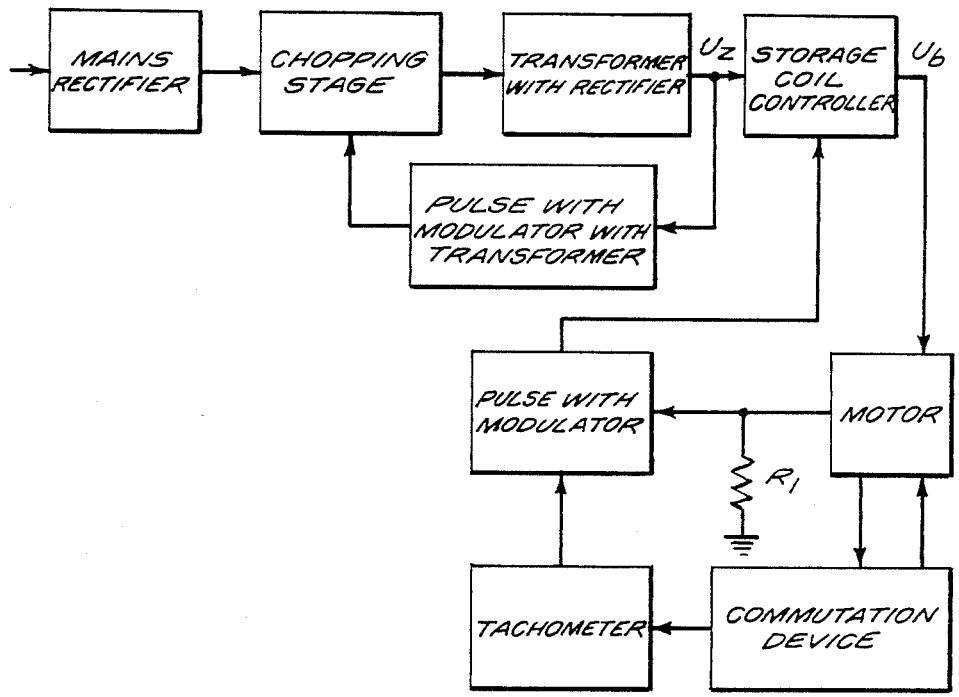

Referring now to FIG. 1 of the drawings, the function of the motor and the drive circuit will be explained. The circuit described avoids the heavy and voluminous mains transformer and uses instead a connected power supply with a mains transformer which is small on account of the high switching frequency. In contrast to the circuit of FIG. 3, a storage coil control circuit is not required. With defective switching transistors in the chopper the voltages $U_z$ and $U_b$ become zero and the pump rotor comes to a standstill.

The motor consists of a stator with two phase windings $W_1$ and $W_2$ electrically shifted by 90° and a permanent magnet rotor M. Under the coil winding heads are arranged two Hall-effect probes at an electrical spacing of 90° which detect the position of the rotor and which produce, in proper phase relationship, by means of switching amplifier and a decoding circuit, four square wave signals of 90° (electrical proportion of duty cycle), which are supplied to the switching transistors in the sequence $T_5$, $T_7$, $T_6$, $T_8$. If $T_5$ is controlled to conduct, $W_1$ is connected to the voltage $+U_b$ and at the resistance $R_1$ there arises a positive voltage drop. After 90° of electrical rotation of the rotor, transistor $T_5$ blocks and the stored magnetic energy in the winding $W_1$ produces at the junction point of diodes $D_5$ and $D_6$ a positive voltage peak which however, via the diode $D_5$ charges the capacitor $C_1$. The remaining three switching procedures for a revolution occur in a similar manner.

The voltage appearing at current measuring resistor $R_1$ is an alternating voltage with alternately two positive and two negative pulses. It is supplied to the pulse width modulator as a control voltage either via a diode or, preferably, via a meter rectifier with an operational amplifier.

The pulse width modulator includes an oscillator which produces square wave pulses with a frequency of 20 kHz, that is alternately positive and negative pulses, the width of which depends on the control voltage from the meter rectifier.

The pulses connect the start of the primary winding of the transformer alternately to the positive and negative terminal of the mains voltage $U_1$ which has been rectified by the rectifier. The end of the winding lies at the junction point of two capacitors switched by means of the voltage $U_1$.

Figure 2:
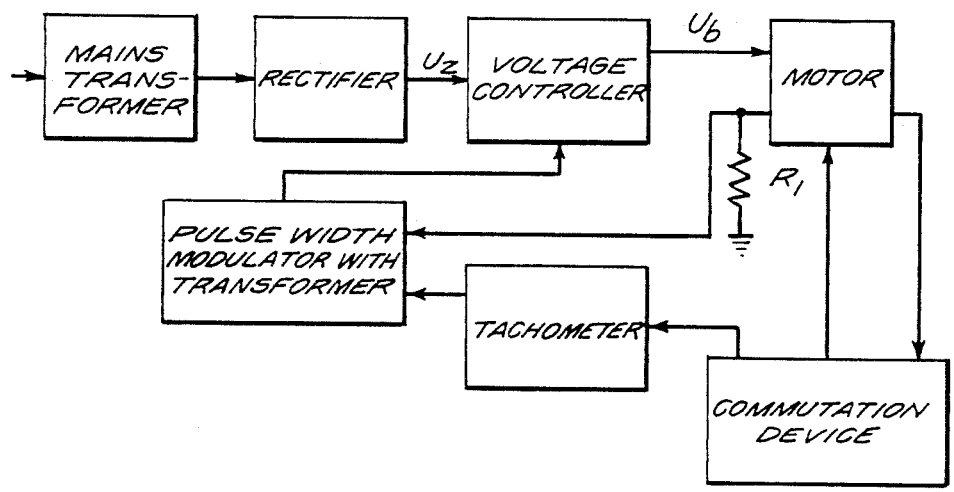
FIGS. 2 and 3 serve to explain the state of the art.

While the current in the primary winding of the transformer flows in the direction of the arrow, the current in the upper secondary winding flows through $D_1$, $L_1$, $T_5$ or $T_7$, $W_1$ or $W_2$, $R_1$ back to the centre of the secondary winding of the transformer. If the current in the primary winding is interrupted, the storage coil $L_1$ delivers further current together with the capacitor C1. The current flows likewise via $T_5$ or $T_7$, $W_1$ or $W_2$, $R_1$ back to the centre point of the transformer and from there back to $L_1$ via the second half of the winding and the free running diode $D_2$. Should the switching transistors $T_5$ and $T_7$ be blocked there results a current flow in the capacitor $C_1$, the voltage of which thereby increases. In the negative branch the current flow results in a similar way. A current control by means of the input transistors is thus provided in which the known control circuit of FIG. 2 reduces to the diode $D_1$ and the coil $L_1$. Upon reaching of the operative rate of rotation the tachometer reduces the desired current value far enough so that the rate of rotation remains constant.

The output voltage of the meter rectifier is further supplied to the dynamic current limiter.

This consists of an amplifier and a compensator.

To one input of this is supplied a desired voltage value, which corresponds to the maximum permitted current value of the end stage transistors $T_5$ and $T_8$.

If the control voltage derived from the meter rectifier exceeds this value, the current in the end stage transistors $T_5$ to $T_8$ is limited by means of the commutation device to the predetermined maximum value.

The arrangement described above in connection with FIG. 1 has several advantages. By means of the arrangement according to the invention of the diodes $D_5$ to $D_8$ the remaining magnetic energy, which arises upon disconnection of the respective winding, is lead back in a simple way from the motor to both the capacitors $C_1$ and $C_2$. Especially advantageous is the arrangement between the current measuring resistor $R_1$ and the input of the pulse width modulator of a meter rectifier with operational amplifier, which rectifies the small a.c. voltage arising at $R_1$, amplifies this and feeds it to the controller. By means of the current control by the input circuit stage the second control circuit is reduced to a Gratz (full-wave) rectifier with a coil and capacitor coupled after. The diodes $D_1$ and $D_4$ replace the switching transistors of the voltage controller of FIG. 2, and the diodes $D_2$ and $D_3$ operate as free wheeling diodes. Both the storage coils $L_1$ and $L_2$ are further necessary to limit the current in the switching stage. The capacitors $C_3$ and $C_4$ serve as intermediate stores for the remaining magnetic energy.

The control voltage is further supplied to the dynamic current limiter consisting of an amplifier and a voltage compensator. The output of the capacitor limits the current in the transistors $T_5$ to $T_8$ via the commutation device.

It will be understood that the above description of the present invention is susceptible to various modifications, changes and adaptations.

What is claimed is:

1. An electric drive arrangement for a motor with two phase windings connected to a common connection point comprising:
    a motor supply having a chopper circuit and a voltage source having a neutral point,
    a pulse width modulator for producing control pulses, said pulse width modulator being connected to said chopper circuit and to the common connection point of the two phase windings,
    a current measuring resistor connecting said common connection point to said neutral point of the voltage source for forming voltage drop proportional to the current through said motor and influencing the width of said control pulses of said pulse width modulator,
    said pulse width modulator being connected to said resistor to vary the widths of the pulses on the basis of the voltage drop across the resistor, said chopper being connected to said pulse width modulator so that said pulse width modulator controls the chopping time on the basis of the voltage drop across the resistor and said chopper being connected to said voltage source to vary the voltage of the voltage source in a direction to keep the current through the resistor constant.

2. A drive arrangement for driving the shaft of a turbomolecular pump operating according to the principle of a brushless d.c. motor and having a permanent-magnetic rotor and a stator with two phase windings electrically shifted by 90°, first ends of said phase windings being inter-connected, at a common point, comprising:
    a centre-tapped voltage source having a positive and a negative terminal,
    four controllable switching elements,
    said positive and said negative terminal of said centre-tapped voltage source being arranged to energize each end of said phase winding by means of two respective ones of said controllable switching elements,
    a commutation device for controlling said four switching elements,
    a current supply apparatus a rectifier,
    a chopper connected to said rectifier,
    a transformer having a primary winding and a secondary centre-tapped winding, said chopper being arranged for switching said primary winding of said transformer,
    a pulse-width modulator producing control pulses controlling the chopper,
    four rectifier diodes connected to said secondary winding in a full wave rectifier circuit to produce a rectified voltage,
    a coil connected to each output of said rectifier circuit,
    the outputs of said coils forming the positive and negative supply terminals for the connection of the motor phase windings,
    serially-connected capacitors connected at the outputs of said coils, the junction point of said capacitors together with the centre tap of said secondary winding forming a neutral point,
    a current measuring resistor connecting said common point to said neutral point for producing a voltage drop at said current-measuring resistor proportional to the motor winding current,
    circuit means connecting said pulse width modulator to said common point,
    said pulse width modulator being arranged for responding to the voltage drop to vary the pulse widths so the pulse widths vary the chopping time of said chopper, said rectifier circuit being arranged to vary the rectified voltage on the basis of the pulse widths so as to maintain the winding current as measured by the resistor constant.

3. A drive arrangement as defined in claim 2 further comprising diodes parallel to said four switching elements with opposed direction of flow, said diodes, upon turning off of the corresponding phase winding, feeding back to said capacitors the remaining induction energy stored in said winding.

4. A drive arrangement as defined in claim 2, further comprising a dynamic current limiter for protecting said switching elements against over-heating, said limiter being responsive to said voltage drop at said current measuring resistor and being connected to said commutation device.

5. A drive arrangement as defined in claim 2 wherein said connecting circuit including a meter rectifier between said current-measuring resistor and said pulse width modulator.

6. A drive arrangement as defined in claim 2 further including a tachometer for detecting that the operative rotational speed has been reached and controlling the width of said control pulses for said chopper so that the rotational speed of said motor remains constant.

7. A drive arrangement for the shaft of a turbomolecular pump operation according to the principle of a brushless d.c. motor and having a permanent-magnetic rotor and a stator with two phase windings electrically shifted by 90°, first ends of said phase windings being inter-connected at a common point, comprising:

- a centre-tapped voltage source having a positive and a negative terminal four controllable switching elements, said positive and said negative terminal of said centre-tapped voltage source each being arranged to energize the other ends of said phase windings by means of two respective ones of said controllable switching elements,
- a commutation device controlling said four switching elements,
- a current supply apparatus a rectifier,
- a transformer having a primary winding and a secondary centre-tapped winding,
- a chopper for switching said primary winding of said transformer,
- a pulse-width modulator for producing control pulse for controlling the chopper,
- four rectifier diodes connected to said secondary winding in a full wave rectifier circuit,
- a coil connected to each output of said rectifier circuit, outputs of said coils forming the positive and negative supply terminals for the connection of the motor,
- serially-connected capacitors connected at the outputs of said coils, the junction point of said capacitors together with the centre-tap of said secondary winding forming a neutral point,
- diodes connected parallel to said four switching elements with opposed direction of flow, said diodes, said switches disconnecting the corresponding phase winding, feeding back to said capacitors the remaining induction energy stored in the winding, measuring means at said common point for measuring current through the motor windings, a pulse width modulator connected to said measuring means for producing pulses for controlling the chopper, said chopper being connected to said full wave rectifier for controlling the voltage of the rectifier and the motor current on the basis of the pulses and the measured current.

* * * * *

UNITED STATES PATENT AND TRADEMARK OFFICE
CERTIFICATE OF CORRECTION

PATENT NO. : 4,520,296

DATED : May 28, 1985

INVENTOR(S) : Eberhard Lepper, et al

It is certified that error appears in the above-identified patent and that said Letters Patent is hereby corrected as shown below:

In the heading of the patent, it should read:

-- [30] Foreign Application Priority Data

Mar. 20, 1982 [DE] Fed. Rep. of Germany ...3210354

Signed and Sealed this

Ninth Day of September 1986

[SEAL]

Attest:

DONALD J. QUIGG

Attesting Officer

Commissioner of Patents and Trademarks